United States Patent
Oza et al.

(10) Patent No.: US 12,079,177 B2
(45) Date of Patent: Sep. 3, 2024

(54) OBJECT VERSIONING SUPPORT FOR A FILE SYSTEM

(71) Applicant: NetApp, Inc., San Jose, CA (US)

(72) Inventors: Dhairesh Oza, Karnataka (IN); Roger W. Cox, Los Altos, CA (US)

(73) Assignee: NetApp, Inc., San Jose, CA (US)

( * ) Notice: Subject to any disclaimer, the term of this patent is extended or adjusted under 35 U.S.C. 154(b) by 25 days.

(21) Appl. No.: 17/852,573

(22) Filed: Jun. 29, 2022

(65) Prior Publication Data

US 2023/0359593 A1    Nov. 9, 2023

(30) Foreign Application Priority Data

May 9, 2022    (IN) .............................. 202241026724

(51) Int. Cl.
*G06F 16/18*    (2019.01)
*G06F 16/13*    (2019.01)

(52) U.S. Cl.
CPC .......... *G06F 16/1873* (2019.01); *G06F 16/13* (2019.01)

(58) Field of Classification Search
CPC .............................. G06F 16/1873; G06F 16/13
USPC ......................................................... 707/829
See application file for complete search history.

(56) References Cited

U.S. PATENT DOCUMENTS

| | | | | |
|---|---|---|---|---|
| 10,893,067 B1 * | 1/2021 | Geil | ....................... | G06F 16/901 |
| 2013/0304745 A1 * | 11/2013 | Dhuse | ................. | G06F 16/2272 |
| | | | | 707/741 |
| 2015/0220558 A1 * | 8/2015 | Snibbe | ..................... | H04N 5/08 |
| | | | | 707/627 |
| 2017/0177452 A1 * | 6/2017 | Parab | .................... | G06F 3/0641 |
| 2018/0137014 A1 * | 5/2018 | Li | ........................ | G06F 11/1458 |
| 2019/0026301 A1 * | 1/2019 | Wang | .................... | G06F 16/152 |
| 2021/0019243 A1 * | 1/2021 | Hickey | ................. | G06F 3/0641 |
| 2021/0232595 A1 * | 7/2021 | Solan | .................. | G06F 16/2246 |
| 2022/0155962 A1 * | 5/2022 | Mundra | ............. | G06F 11/1451 |

OTHER PUBLICATIONS

Amazon Simple Storage Service—API Reference : User Guide, Version Mar. 1, 2006, pp. 1-1587.
API Reference., "Amazon Simple Storage Service," Amazon Simple Storage Service API Reference, 2006, pp. 1-1113.
Technical Report., "S3 in ONTAP Best Practices," NetApp, 2022, pp. 1-26.

* cited by examiner

*Primary Examiner* — Cam Linh T Nguyen
(74) *Attorney, Agent, or Firm* — Jaffery Watson Hamilton & DeSanctis LLP

(57) ABSTRACT

Systems, methods, and data structures for providing a file system with object versioning support are provided. Rather than adding object records for each version of an object to a chapter record, in one example, the chapter record may be limited to a single object record for the object including: (i) an object name of the object; (ii) an object file handle identifying an index of a file containing data of a current version of the multiple versions of the object; and (iii) a version table file handle identifying an index of a file containing a version table. In this manner, enumeration of objects associated with a given chapter may be performed more efficiently and prior versions of objects may be maintained within the version table without disproportionate growth of chapter records and without increasing the search depth with objects that are not referenced by the search at issue.

24 Claims, 11 Drawing Sheets

OBJECT VERSIONING SUPPORT FOR A FILE SYSTEM

CROSS-REFERENCE TO RELATED PATENTS

This application claims the benefit of priority to Indian Provisional Application No. 202241026724 filed on May 9, 2022, which is hereby incorporated by reference in its entirety for all purposes.

FIELD

Various embodiments of the present disclosure generally relate to file systems and data storage systems. In particular, some embodiments relate to an efficient data structure for supporting multiple versions of objects within a tree maintained by a file system of a data storage system.

BACKGROUND

Object protocols (e.g., Amazon's Simple Storage Service (S3) protocol) may be used for interfacing with object storage over a network, by using buckets, keys and operations. Object protocols may use versioning to keep multiple versions of an object in a bucket, thereby allowing a prior version of an object to be restored that has been accidentally deleted or overwritten.

BRIEF DESCRIPTION OF THE DRAWINGS

The present disclosure is best understood from the following detailed description when read with the accompanying figures.

Figure 1:
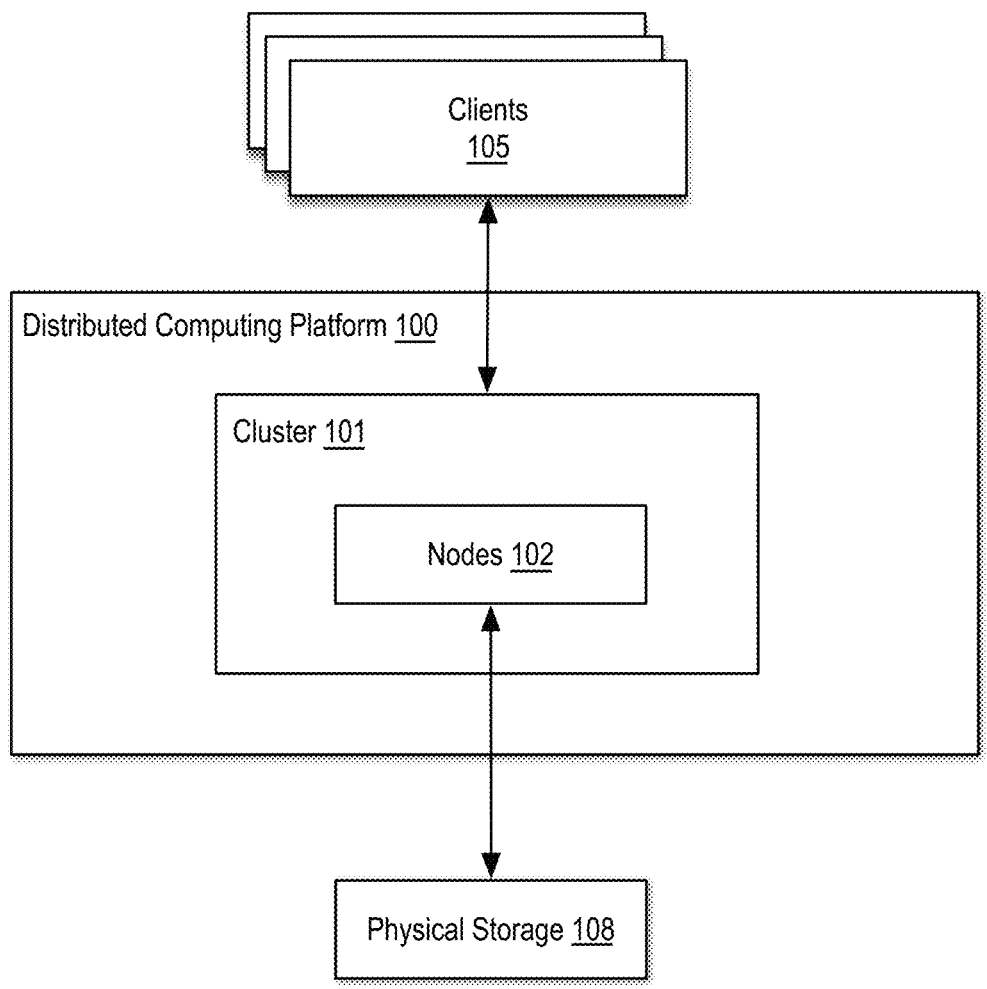
FIG. 1 is a block diagram illustrating an example of a distributed storage system 100 in accordance with one or more embodiments.

The drawings have not necessarily been drawn to scale. Similarly, some components and/or operations may be separated into different blocks or combined into single blocks for the purposes of discussion of some embodiments of the present technology. Moreover, while the technology is amenable to various modifications and alternate forms, specific embodiments have been shown by way of example in the drawings and are described in detail below. The intention, however, is not to limit the technology to the particular embodiments described or shown. On the contrary, the technology is intended to cover all modifications, equivalents, and alternatives falling within the scope of the technology as defined by the appended claims.

SUMMARY

Systems, methods, and data structures are described for providing a file system with object versioning support. According to one embodiment, a memory or persistent storage stores at least a portion of a tree data structure to facilitate access to an object by a file system of a storage system. The tree data structure includes a chapter record containing a single object record for the object, in which the single object record includes: (i) an object name of the object; (ii) an object file handle identifying an index of a file containing data of a current version of multiple versions of the object; and (iii) a version table file handle identifying an index of a file containing a version table, wherein the version table includes for each version of the plurality of versions of the object, a version identifier (ID) and an object file handle identifying an index of a file containing data of the version of the object.

Other features of embodiments of the present disclosure will be apparent from accompanying drawings and detailed description that follows.

DETAILED DESCRIPTION

Systems, methods, and data structures are described for providing a file system with object versioning support. As described further below with reference to FIG. 6, one way to represent versions for an object is to include a version identifier (ID) in an object record for the object in a chapter record, so the versions of the object is represented by a sequence of records in the chapter. Notably, however, such an approach has a number of disadvantages, including complicating object enumeration, expanding the size of chapter records (to include the version ID, among other data and/or metadata), and increasing search depth. For example, consider a particular object having a million versions. In connection with searching for the current version of the particular object, up to 999,999 other versions of the particular object may be evaluated to locate the current version of the particular object.

Various embodiments described herein seek to address or at least mitigate various of the aforementioned disadvantages by more efficiently representing object records within a chapter record. For example, in one embodiment, a memory or persistent storage for storing information regarding objects for access by a file system of a storage system may include a tree data structure stored in the memory or persistent storage. The tree data structure may contain information regarding an object associated with a bucket. The object may have multiple versions. Rather than including information regarding each object version within the object record for the object or adding additional object records for each version within the chapter record, embodiments described herein limit the chapter record to a single object record for the object including: (i) an object name of the object; (ii) an object file handle identifying an index of a file containing data of a current version of the multiple versions of the object; and (iii) a version table file handle identifying an index of a file containing a version table. The version table may include for each version of the multiple versions of the object, a version identifier (ID) and an object file handle identifying an index of a file containing data of the version of the object. In this manner, the chapter record points to the current version of objects associated with the chapter, thereby making enumeration of objects associated with a given chapter more efficient. Additionally, prior versions of objects may be maintained without growing the size of chapter records proportional to the number of versions and without increasing the search depth with objects that are not referenced by the search at issue.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein a "V+ tree" generally refers to an m-ary tree data structure with a variable number of children per node. A V+ tree consists of a root, internal nodes, and leaves. A V+ tree can be viewed as a B+ tree in which the keys contained within the nodes are variable length.

Example High-Level View of a Distributed Storage System

FIG. 1 is a block diagram illustrating an example of a distributed storage system (e.g., cluster 101) within a distributed computing platform 100 in accordance with one or more embodiments. In one or more embodiments, the distributed storage system may be implemented at least partially virtually. In the context of the present example, the distributed computing platform 100 includes a cluster 101. Cluster 101 includes multiple nodes 102. In one or more embodiments, nodes 102 include two or more nodes. A non-limiting example of a way in which cluster 101 of nodes 102 may be implemented is described in further detail below with reference to FIG. 10.

Nodes 102 may service read requests, write requests, or both received from one or more clients (e.g., clients 105). In one or more embodiments, one of nodes 102 may serve as a backup node for the other should the former experience a failover event. Nodes 102 are supported by physical storage 108. In one or more embodiments, at least a portion of physical storage 108 is distributed across nodes 102, which may connect with physical storage 108 via respective controllers (not shown). The controllers may be implemented using hardware, software, firmware, or a combination thereof. In one or more embodiments, the controllers are implemented in an operating system within the nodes 102. The operating system may be, for example, a storage operating system (OS) that is hosted by the distributed storage system. Physical storage 108 may be comprised of any number of physical data storage devices. For example, without limitation, physical storage 108 may include disks or arrays of disks, solid state drives (SSDs), flash memory, one or more other forms of data storage, or a combination thereof associated with respective nodes. For example, a portion of physical storage 108 may be integrated with or coupled to one or more nodes 102.

In some embodiments, nodes 102 connect with or share a common portion of physical storage 108. In other embodiments, nodes 102 do not share storage. For example, one node may read from and write to a first portion of physical storage 108, while another node may read from and write to a second portion of physical storage 108.

Should one of the nodes 102 experience a failover event, a peer high-availability (HA) node of nodes 102 can take over data services (e.g., reads, writes, etc.) for the failed node. In one or more embodiments, this takeover may include taking over a portion of physical storage 108 originally assigned to the failed node or providing data services (e.g., reads, writes) from another portion of physical storage 108, which may include a mirror or copy of the data stored in the portion of physical storage 108 assigned to the failed node. In some cases, this takeover may last only until the failed node returns to being functional, online, or otherwise available.

Example Operating Environment

Figure 2:
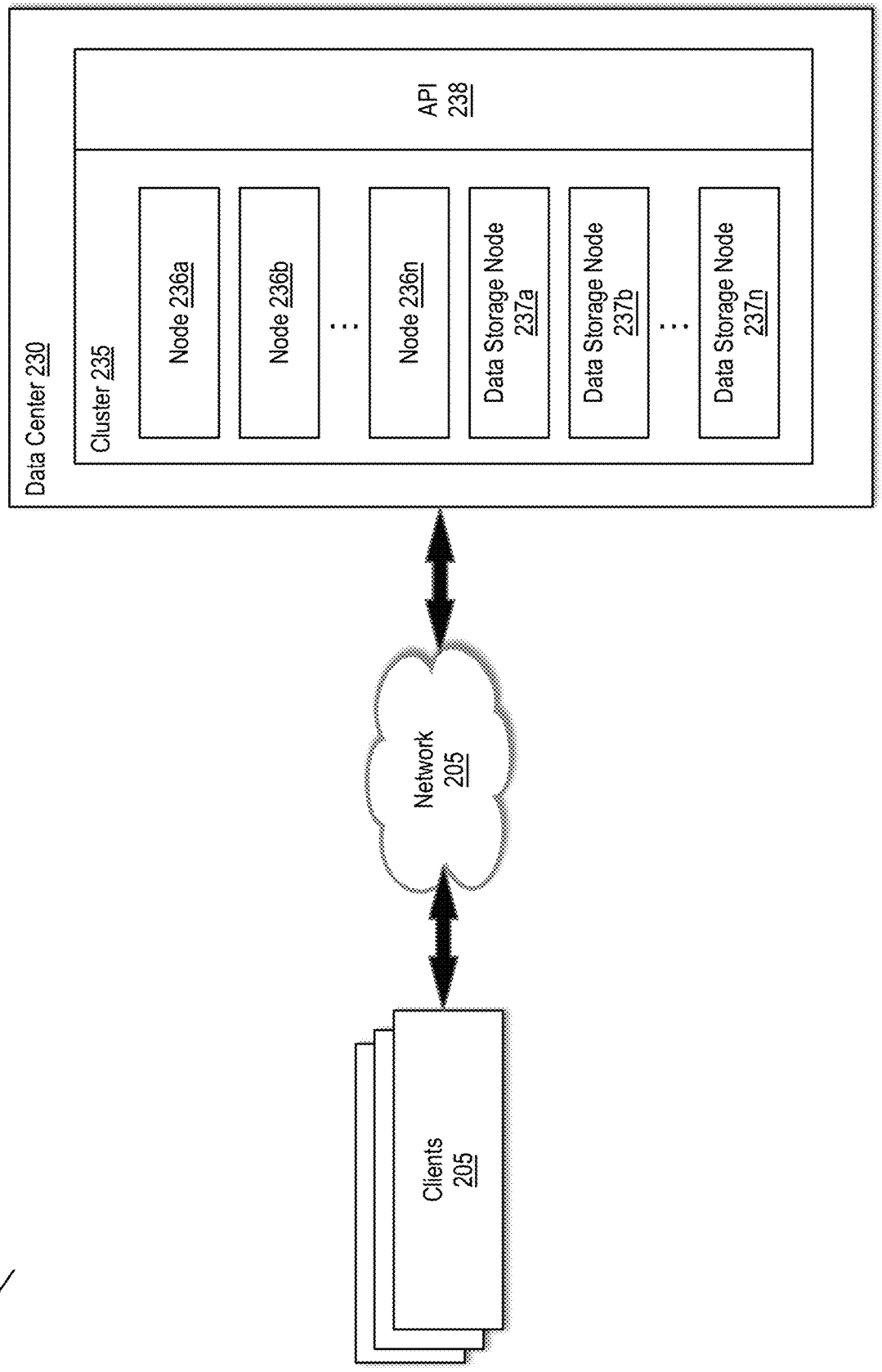
FIG. 2 is a block diagram illustrating an example on-premise environment in which various embodiments may be implemented.

FIG. 2 is a block diagram illustrating an example on-premise environment 200 in which various embodiments may be implemented. In the context of the present example, the environment 200 includes a data center 230, a network 205, and clients 205 (which may be analogous to clients 105). The data center 230 and the clients 205 may be coupled in communication via the network 205, which, depending upon the particular implementation, may be a Local Area Network (LAN), a Wide Area Network (WAN), or the Internet. Alternatively, some portion of clients 205 may be present within the data center 230.

The data center 230 may represent an enterprise data center (e.g., an on-premises customer data center) that is build, owned, and operated by a company or the data center 230 may be managed by a third party (or a managed service provider) on behalf of the company, which may lease the equipment and infrastructure. Alternatively, the data center 230 may represent a colocation data center in which a company rents space of a facility owned by others and located off the company premises. The data center 230 is shown including a distributed storage system (e.g., cluster 235). Those of ordinary skill in the art will appreciate additional information technology (IT) infrastructure would typically be part of the data center 230; however, discussion of such additional IT infrastructure is unnecessary to the understanding of the various embodiments described herein.

Turning now to the cluster 235 (which may be analogous to cluster 101), it includes multiple nodes 236a-n and data storage nodes 237a-n (which may be analogous to nodes 102 and which may be collectively referred to simply as nodes) and an Application Programming Interface (API) 138. In the context of the present example, the nodes are organized as a cluster and provide a distributed storage architecture to service storage requests issued by one or more clients (e.g., clients 205) of the cluster. The data served by the nodes may be distributed across multiple storage units embodied as persistent storage devices, including but not limited to hard disk drives, solid state drives, flash memory systems, or other storage devices. A non-limiting example of a node is described in further detail below with reference to FIG. 10.

The API 238 may provide an interface through which the cluster 235 is configured and/or queried by external actors. Depending upon the particular implementation, the API 138 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 238 may provide access to various telemetry data (e.g., performance, configuration and other system data) relating to the cluster 235 or components thereof. As those skilled in the art will appreciate various types of telemetry data may be made available via the API 137, including, but not limited to measures of latency, utilization, and/or performance at various levels (e.g., the cluster level, the node level, or the node component level).

Figure 3:
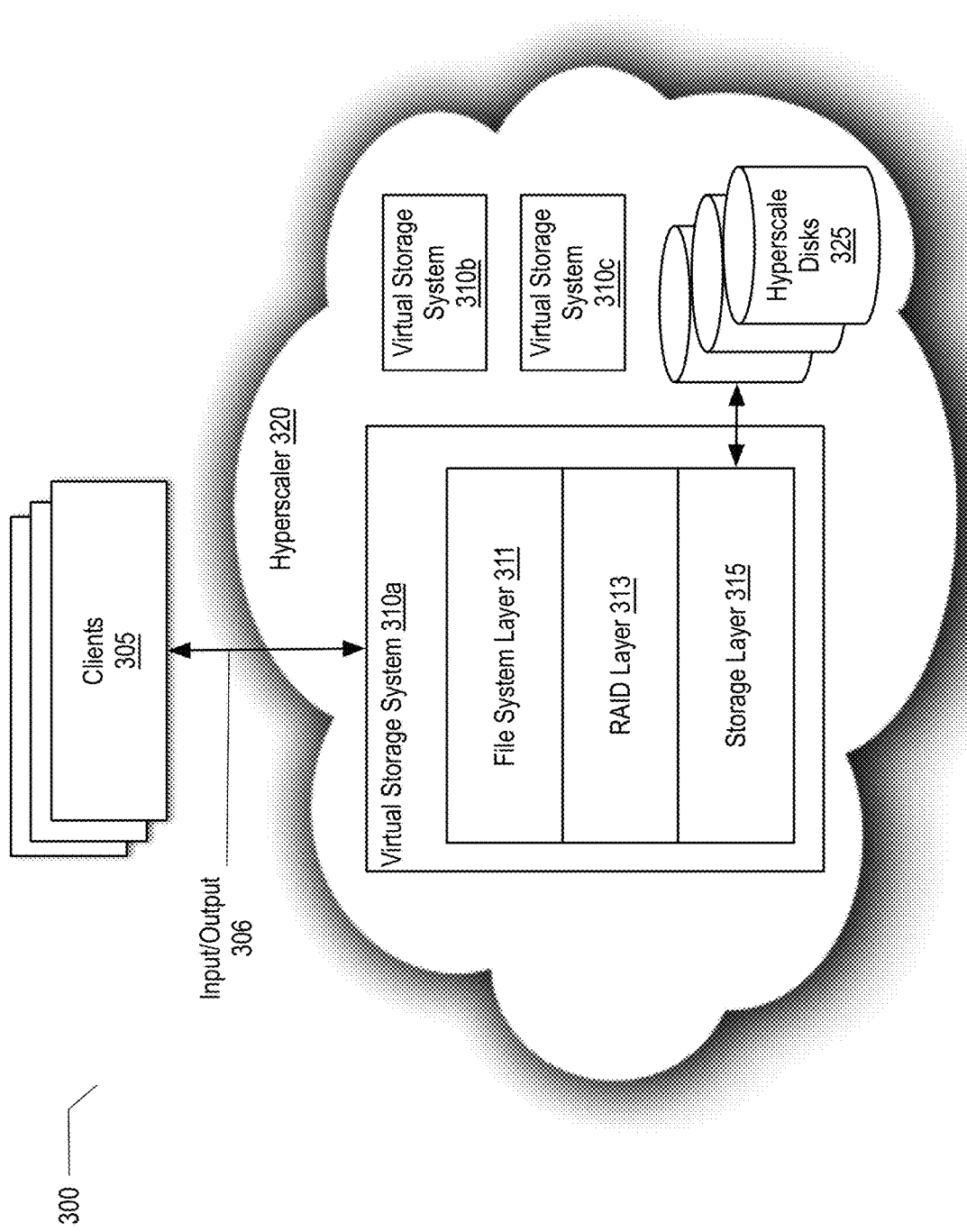
FIG. 3 is a block diagram illustrating an example cloud environment in which various embodiments may be implemented.

FIG. 3 is a block diagram illustrating an example cloud environment (e.g., hyperscaler 320) in which various embodiments may be implemented. In the context of the present example, a virtual storage system 310a, which may be considered exemplary of virtual storage systems 310b-c, may be run (e.g., on a VM or as a containerized instance, as the case may be) within a public cloud provided by a public cloud provider (e.g., hyperscaler 320). In this example, the virtual storage system 310a makes use of storage (e.g., hyperscale disks 325) provided by the hyperscaler, for example, in the form of solid-state drive (SSD) backed or hard-disk drive (HDD) backed disks. The cloud disks (which may also be referred to herein as cloud volumes, storage devices, or simply volumes or storage) may include persistent storage (e.g., disks) and/or ephemeral storage (e.g., disks), which may be analogous to physical storage 108.

The virtual storage system 310a may present storage over a network to clients 305 (which may be analogous to clients 105 and 205) using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 305 may request services of the virtual storage system 310 by issuing Input/Output requests 306 (e.g., file system protocol messages (in the form of packets) over the network). A representative client of clients 305 may comprise an application, such as a database application, executing on a computer that "connects" to the virtual storage system 310 over a computer network, such as a point-to-point link, a shared local area network (LAN), a wide area network (WAN), or a virtual private network (VPN) implemented over a public network, such as the Internet.

In the context of the present example, the virtual storage system 310a is shown including a number of layers, including a file system layer 311 and one or more intermediate storage layers (e.g., a RAID layer 313 and a storage layer 315). These layers may represent components of data management software or storage operating system (not shown) of the virtual storage system 310. The file system layer 311 generally defines the basic interfaces and data structures in support of file system operations (e.g., initialization, mounting, unmounting, creating files, creating directories, opening files, writing to files, and reading from files). A non-limiting example of the file system layer 311 is the Write Anywhere File Layout (WAFL) Copy-on-Write file system (which represents a component or layer of ONTAP software available from NetApp, Inc. of San Jose, CA).

The RAID layer 313 may be responsible for encapsulating data storage virtualization technology for combining multiple hyperscale disks 325 into RAID groups, for example, for purposes of data redundancy, performance improvement, or both. The storage layer 315 may include storage drivers for interacting with the various types of hyperscale disks 325 supported by the hyperscaler 320. Depending upon the particular implementation the file system layer 311 may persist data to the hyperscale disks 325 using one or both of the RAID layer 313 and the storage layer 3115.

The various layers described herein, and the processing described below may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, and storage arrays, such as the computer system described with reference to FIG. 11 below.

Example Multitiered Namespace

Figure 4:
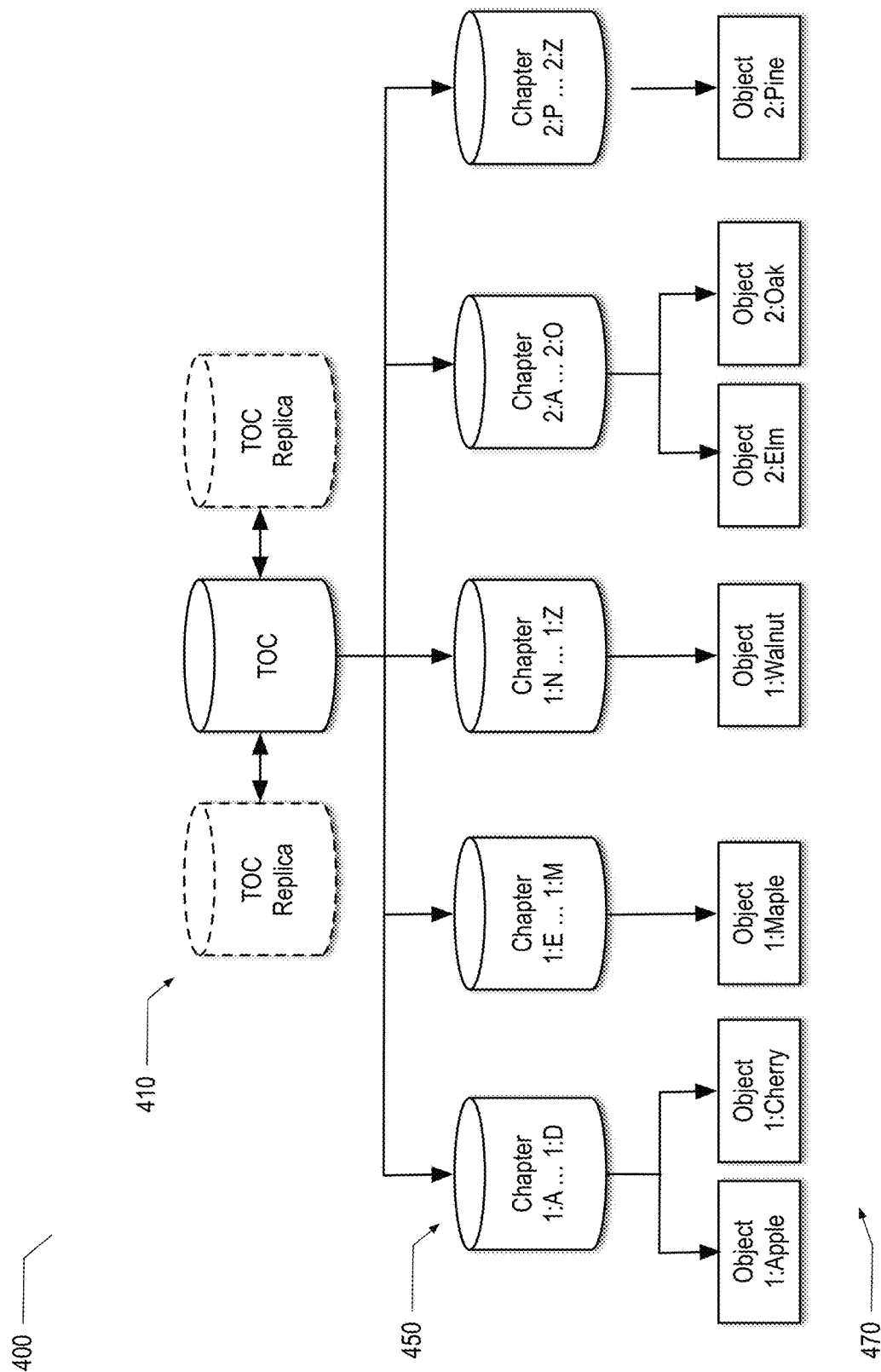
FIG. 4 illustrates an example multitiered namespace built from a changing collection of small variable length databases in accordance with one embodiment.

FIG. 4 illustrates an example multitiered namespace 400 built from a changing collection of small variable length databases in accordance with one embodiment. In the context of the present example, a top tier 410 of the namespace 400 is a single chapter database called the Table of Contents, and each record in it points to a second-tier 450 having child databases called Chapter databases. Each chapter database may be responsible for holding all names within a contiguous range of the namespace—so, one chapter might have names that start with A through F, while the next chapter has all names that start with G through H, and so on.

In one embodiment, a storage OS of a distributed storage system (e.g., cluster 101, cluster 235, or a cluster including virtual storage systems 310*a-c*) provides a change tracking mechanism that scales with a flex group that may contain up to 400 billion objects in a single bucket if needed. A flex group is conceptually a single group that can have a large number of volumes on various aggregates (e.g., sets of disks) of various storage nodes. A large number of buckets can be located in a flex group. The storage OS may utilize multiple nodes and volumes in order to avoid a single volume bottleneck. In one example, objects are accessed exclusively through an object storage protocol (OSP) protocol (e.g., the Amazon S3 protocol, not Network attached storage (NAS) protocols (e.g., Network File System (NFS) protocol, Common Internet File System (CIFS) protocol, and the like). Clients (e.g., clients 105, 205, or 305) may use the OSP to create objects within a bucket, which may refer to a discrete container that stores a collection of objects, of the distributed storage system. Each such object is given a name, and the collective bucket is expected to be able to later retrieve an object by that name efficiently. Further, clients expect to be able to iterate the list of named objects at any time—starting at any name—and receive subsequent names in alphabetic sort order.

A Flex Group can hold lots of separate buckets. Despite each bucket having its own namespace from the customer's point of view, the parent Flex Group may have a single table of contents (TOC) database that covers all buckets stored in the Flex Group. This works because the bucket number may be included as part of the sort key for an object name, and each bucket may use its own distinct collection of chapter databases underneath for that common TOC. So, in one embodiment, not only do bucket 1's names all sort before bucket 2's names, those two buckets have entirely disjoint collections of chapter databases—meaning that any given chapter database holds object names for exactly one bucket. Each bucket may start with one chapter database when it's empty, but over time it might grow to include more chapter databases.

The collection of chapter databases used by a bucket changes over time. If the client has been doing lots of PUTs and a chapter database has grown too large, the chapter database divides itself into two databases right around its midline and updates the TOC to reflect the new responsibilities. Alternatively, if a chapter database gets too small, it merges with one of its siblings and again updates the TOC. That sort of behavior is similar to use of B+ trees—but there's only one level involved here, since the TOC itself may not divide.

The TOC may be stored at a fixed file identifier (ID), and the TOC can be replicated among three different Flex Group members for resiliency. A special protocol may be used to help all members know where copies of the TOC are located. For example, the TOC itself may be slow-changing: its records may only change when whole chapter databases are inserted and removed. This makes the TOC a great candidate for read-only caching. Having that sort of high-level sorting data cacheable means that the storage OS can now make reasonable routing decisions to find a correct chapter for an object. If the Flex Group heuristics have been doing well, then once the correct chapter is located, it will be determined that most of the objects mentioned by that chapter are on the same member volume. Thus, scaling, namespace distribution, caching, automatic corruption recovery, and even built-in redundancy for the critical parts of the namespace may be supported.

For the lower tier 450, each bucket may have its own discrete set of chapters. Each chapter covers a contiguous range of the namespace. Chapter records of a chapter may point to individual objects 1570 with that bucket. Each object may be stored as a file system index node (inode). Some object metadata may be stored with the inode, some in inode labels, and/or some in the chapter records.

Example without Object Versioning

Figure 5:
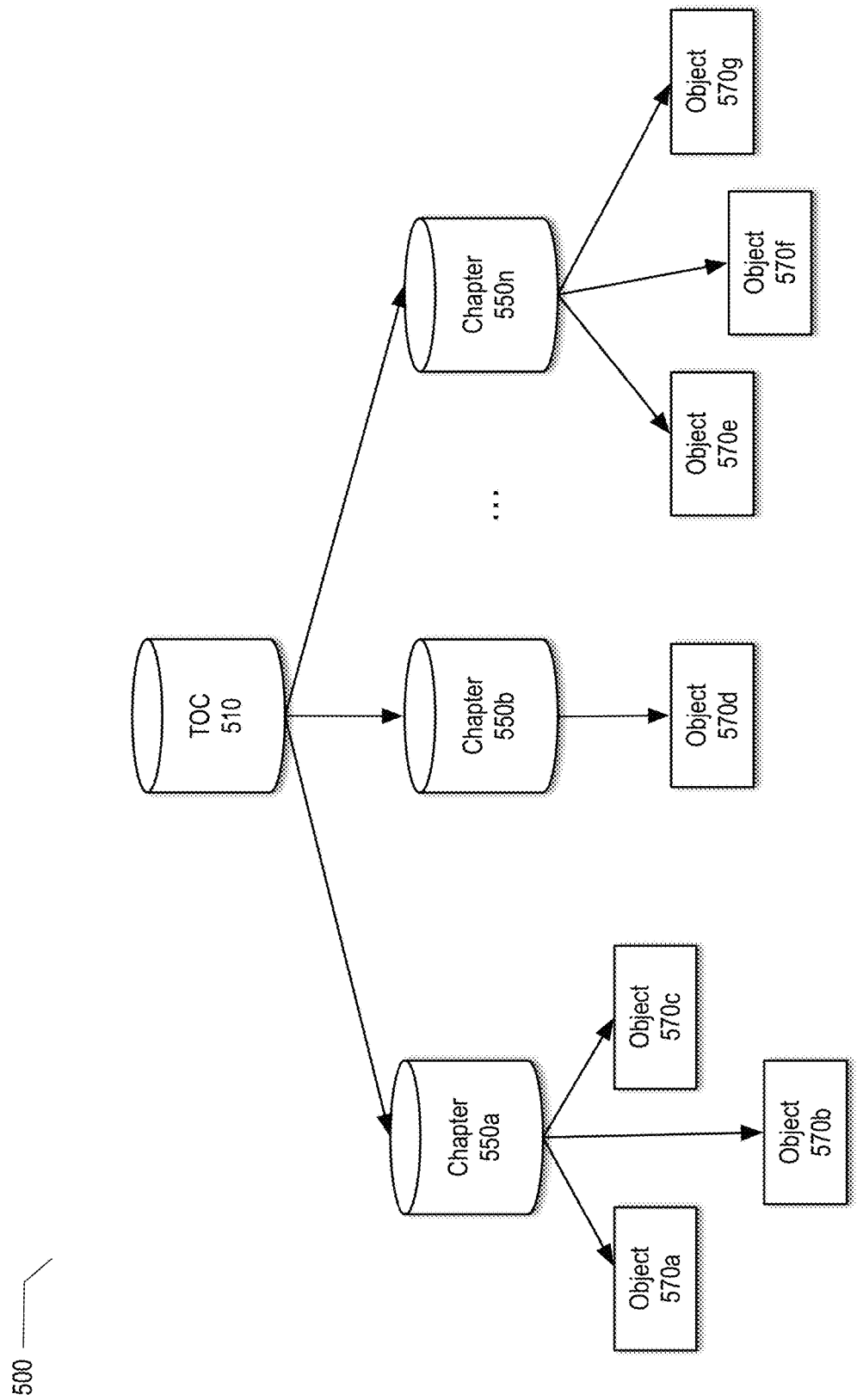
FIG. 5 illustrates a tree of objects without object versioning.

FIG. 5 illustrates a tree 500 of objects (e.g., objects 570*a-g*) without object versioning. In this example, TOC 510 may be analogous to the TOC maintained in layer 410 of FIG. 4 and chapters 550*a-n* may be analogous to the chapter databases maintained in layer 450 of FIG. 4. In this example, an unversioned bucket includes objects. As there is only a single version of each object, the growth of the chapter record (not shown) including object records (not shown) for each object is linear as a function of the number of objects.

Example of a Naïve Approach to Object Versioning

Figure 6:
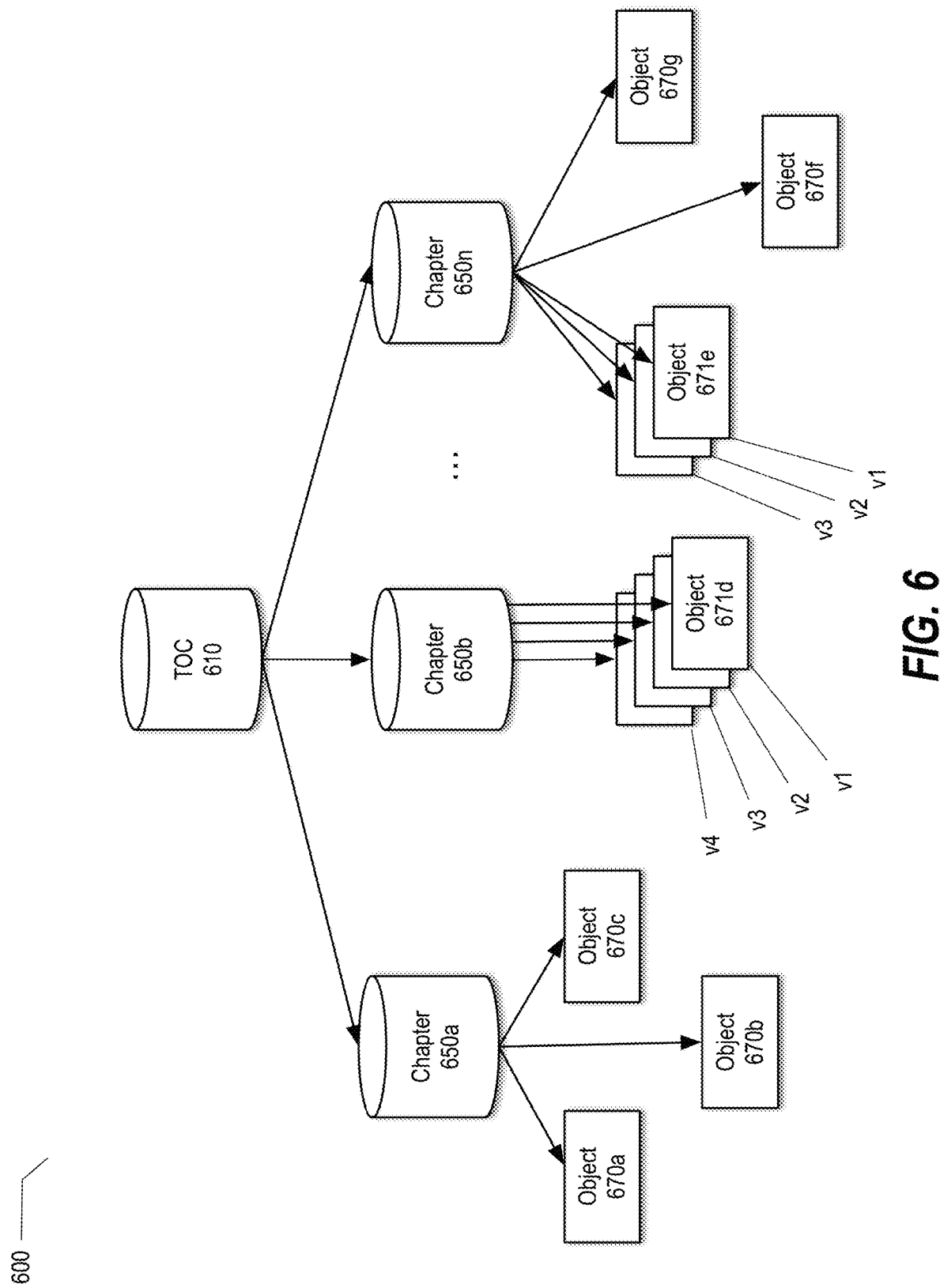
FIG. 6 illustrates one approach for representing object versions within a V+ tree by including a version ID in chapter object records.

FIG. 6 illustrates one approach for representing object versions within a V+ tree by including a version ID in chapter object records. In this example, in which TOC 610 may be analogous to TOC 510 and chapter databases 650*a-n* may be analogous to chapter databases 550*a-n*, the bucket in which objects (e.g., objects 670*a-c*, 670*f-g*, 671*d*, and 671*e*)

are stored is a versioned bucket. As such each object may include multiple versions. For example, when an object is overwritten, instead of deleting a predecessor object (i.e., an object having the same name), the new object becomes current and the prior object remains. For example, object 671d is shown including a current version (v4) and multiple prior versions v3, v2, and v1. Similarly, object 671e is shown including a current version (v3) and multiple prior versions v2 and v1. As shown by the arrows originating from chapter database 650b and terminating at versions v1, v2, v3, and v4 of object 671d and the arrows originating from chapter database 650n and terminating at versions v1, v2, and v3 of object 671e, in this naïve implementation, a chapter record including an object record for each object would add additional data (e.g., a version ID, a pointer to the corresponding object version, and potentially other data and/or metadata) for each object version.

As noted above, such an approach to object versioning has a number of disadvantages, including complicating object enumeration, expanding the size of chapter records, and increasing search depth.

Example of an Improved Approach to Object Versioning

Figure 7:
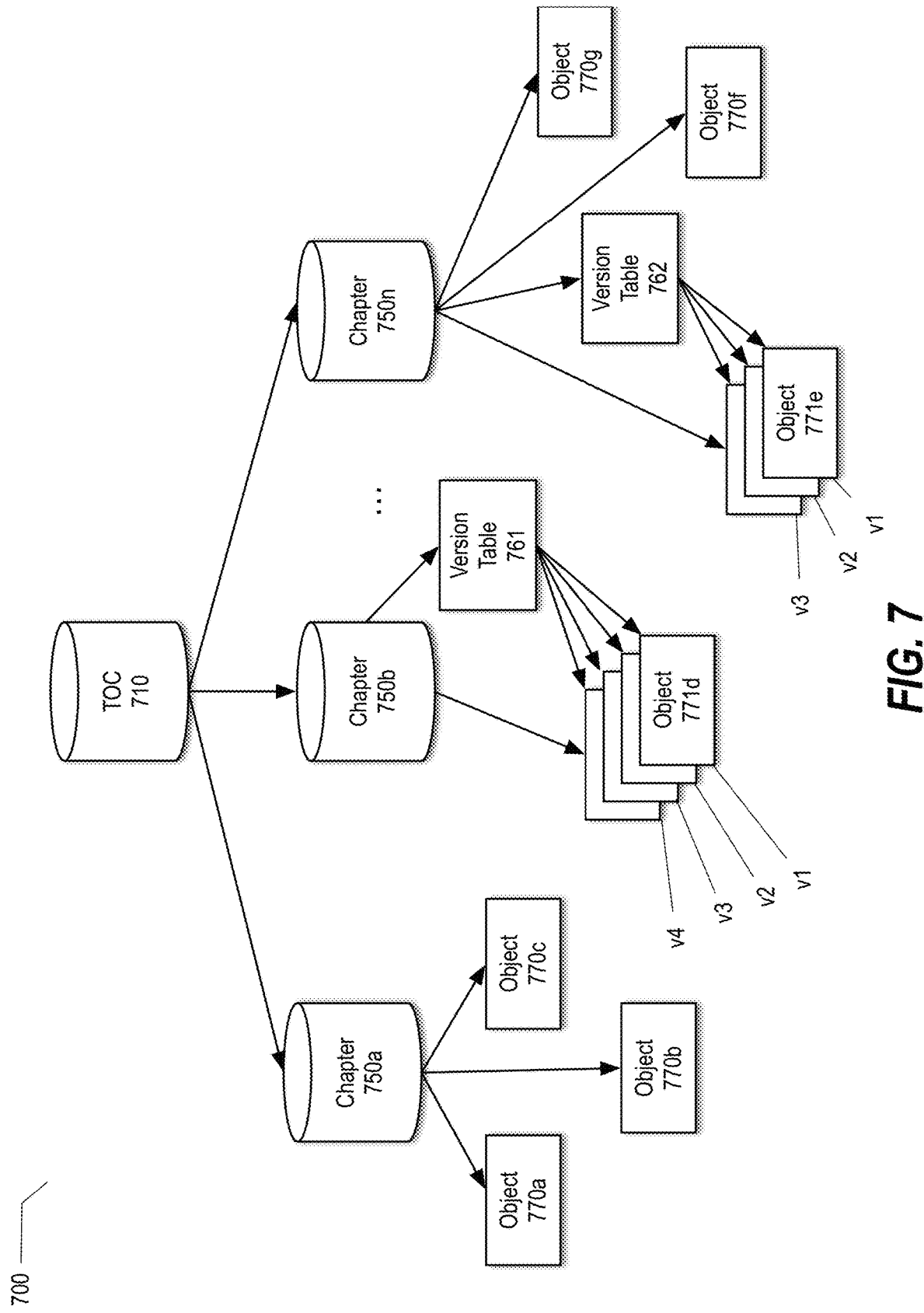
FIG. 7 illustrates an example approach for representing object versions within a V+ tree in accordance with one or more embodiments.

FIG. 7 illustrates an example approach for representing object versions within a V+ tree 700 in accordance with one or more embodiments. According to one embodiment, V+ tree 700 may be maintained on persistent storage (e.g., physical storage 108) and at least a portion of V+ tree 700 may be cached within a memory of a node (e.g., one of nodes 102) to facilitate fast access. In this example, in which TOC 710 may be analogous to TOC 510 and chapter databases 750a-n may be analogous to chapter databases 550a-n, the bucket in which objects (e.g., objects 770a-c, 770f-g, 771d, and 771e) are stored is a versioned bucket.

In contrast to the naïve approach depicted in FIG. 6, in which the chapter record of a chapter database grows linearly based on the average number of versions per object in associated with the chapter database, a version table (e.g., version table 761 and version table 762) is logically interposed between the chapter database and the various versions of a particular object. In this manner, the chapter record of a chapter database continues to grow linearly based on the number of objects as only a constant number of additional data items (e.g., a pointer to the version table) are added to the chapter record for each object having multiple versions.

As described further below with reference to FIG. 8, in one embodiment, the object records for each object having multiple versions within a chapter database may always point to the current version of an object having multiple versions, thereby facilitating more efficient object enumeration as the chapter record is not encumbered with excessive data/metadata relating to all object versions of all objects within the chapter database. Additionally, object versioning may be supported with the inclusion of minimal data (e.g., a pointer to the version table for the particular object), thereby avoiding excessive expansion of the size of the chapter records within additional data/metadata relating to each version of each object. Non-limiting examples of a chapter record, object records, a version table, and version table records are described further below with reference to FIG. 8.

Figure 8:
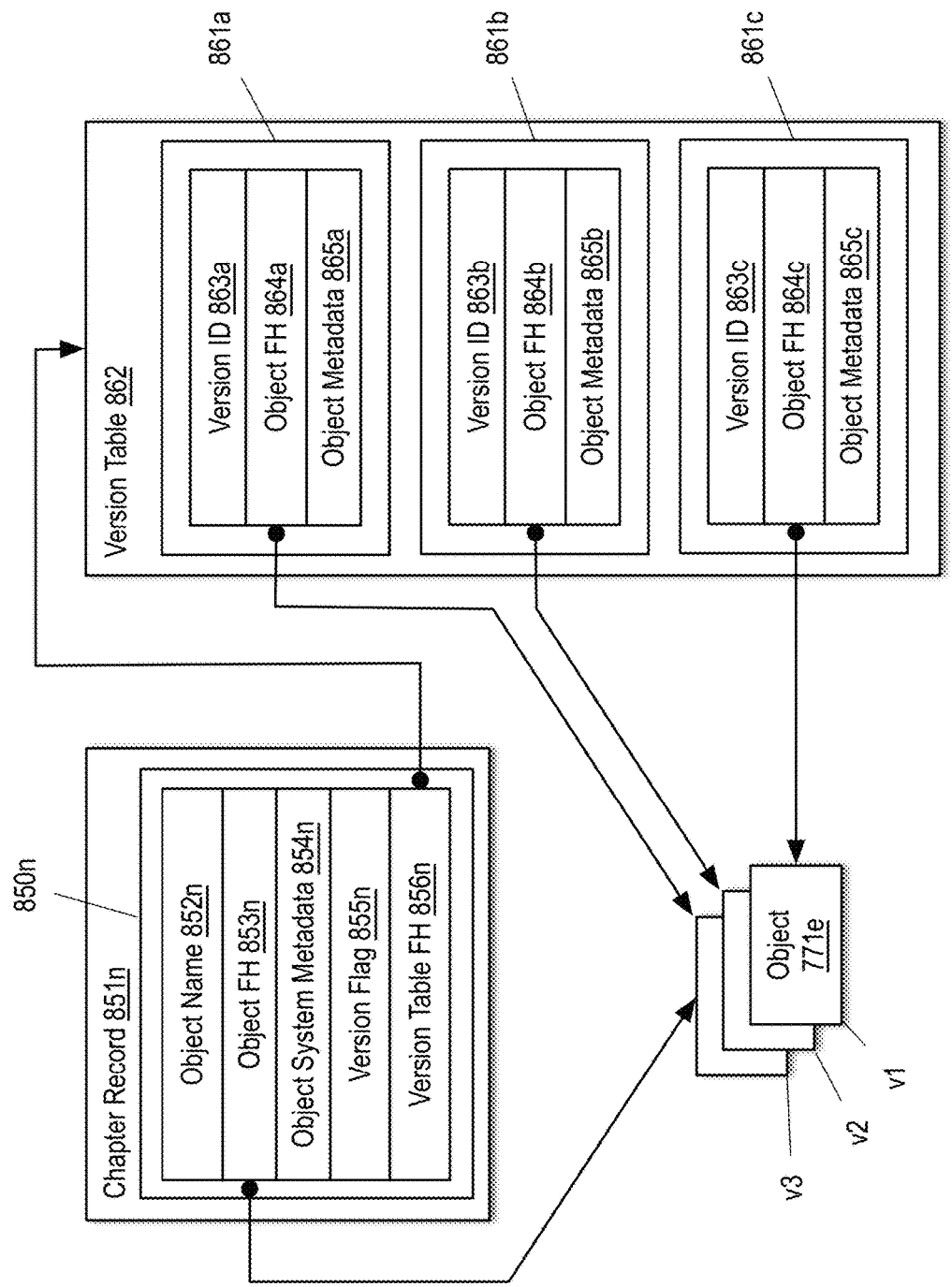
FIG. 8 is a block diagram illustrating an example chapter record and an example version table in accordance with one or more embodiments.

FIG. 8 is a block diagram illustrating an example chapter record 850n and an example version table 862 in accordance with one or more embodiments. In the context of the present example, an object record structure (e.g., object record 851n) that may be used for objects having multiple versions is shown within chapter record 850n. Object record 850n corresponds to object 771e. While for simplicity, only a single chapter record is shown, it is to be appreciated for each additional object (e.g., objects 770g and 770g) within the chapter database at issue (e.g., chapter database 750n) an object record similar to object record 851n as well as a corresponding version table (having a structure similar to version table 862) may be added to the chapter record 850n

In the context of the present example, chapter record 851n is shown including an object record 850n for object 771e. Object record 850n includes an object name 852n, an object file handle (FH) 853n, other object system metadata 854n, a version flag 855n, and a version table FH 856n. The object name 852n may be a variable-length string representing the name of object 771e. The object FH 853n may represent an index (e.g., an inode) of a file system object (e.g., a file) in which the data for the current version (e.g., v3 in this example) of object 771e is stored. The version flag 855n may be used to distinguish between objects initially created after versioning was enabled for the bucket and hence having a version ID and objects initially created prior to versioning having been for the bucket and hence having no version ID or a version ID of null.

In the context of the present example, version table 862 is shown including a version table record (e.g., version table records 861a-c) for each version (e.g., v1, v2, and v3) of object 771e. Each version table record includes a version ID (e.g., version ID 863a-c), an object FH 864a-c, and object metadata (e.g., object metadata 865a-c). The version ID may be used as the key for the version table 862 and may represent the time at which the particular version of the object was created (e.g., including seconds and nanoseconds). In this manner, when versions of an object are listed, they will appear in the order in which they were created with the most recently stored version (the current version) returned first. The object FH may represent an index (e.g., an inode) of a file system object (e.g., a file) in which the data for the particular version (identified by the version ID) of object 771e is stored. For example, object FH 863a points to v3 of object 771e, object FH 863b points to v2 of object 771e, and object FH 863c points to v1 of object 771e. Objects (e.g., object 771e) may include data and metadata. The metadata may include a bucket number of the bucket in which the object resides, the object name, and a checksum or message digest (e.g., MD5) of the data.

According to one embodiment, when a client (e.g., one of clients 105, 205, or 305) requests the data for a particular object, for example, by issuing a read request to the file system (e.g., file system layer 311) of a node (e.g., one of nodes 102) for the particular object (e.g., identified by its object name), the file system will locate the appropriate chapter record (e.g., within the appropriate chapter database) and locate the particular object within the chapter record using the object name as the key. Then, assuming the request is for the data for the current version of the particular object, the file system, will retrieve the data using the object FH of the object. Otherwise, if the request is for the data of a prior version, then the version table may be searched using the supplied version ID as the key to locate the version table record for the version at issue and the object FH of the version table record may be used to retrieve the data. In either case, the retrieved data may then be returned to the client.

According to one embodiment, when the client overwrites the data for a particular object that already exists, for example, by issuing a write request to the file system for the particular object, the file system will locate the appropriate chapter record. Then, the file system, locates the particular object within the chapter record using the object name as the key. As the object already exists, a new version of the object is created within the V+ tree by adding a new version record to the version table and updating the object FH of the object record to point to the new version (which now represents the current version of the object).

In one embodiment, if one or more versions of an object are expressly deleted, leaving only one version of the object remaining, the version table may be deleted and the version table FH may be set to null. When an object is deleted, the versions of the object may be retained as described below with reference to FIG. 9.

Figure 9:
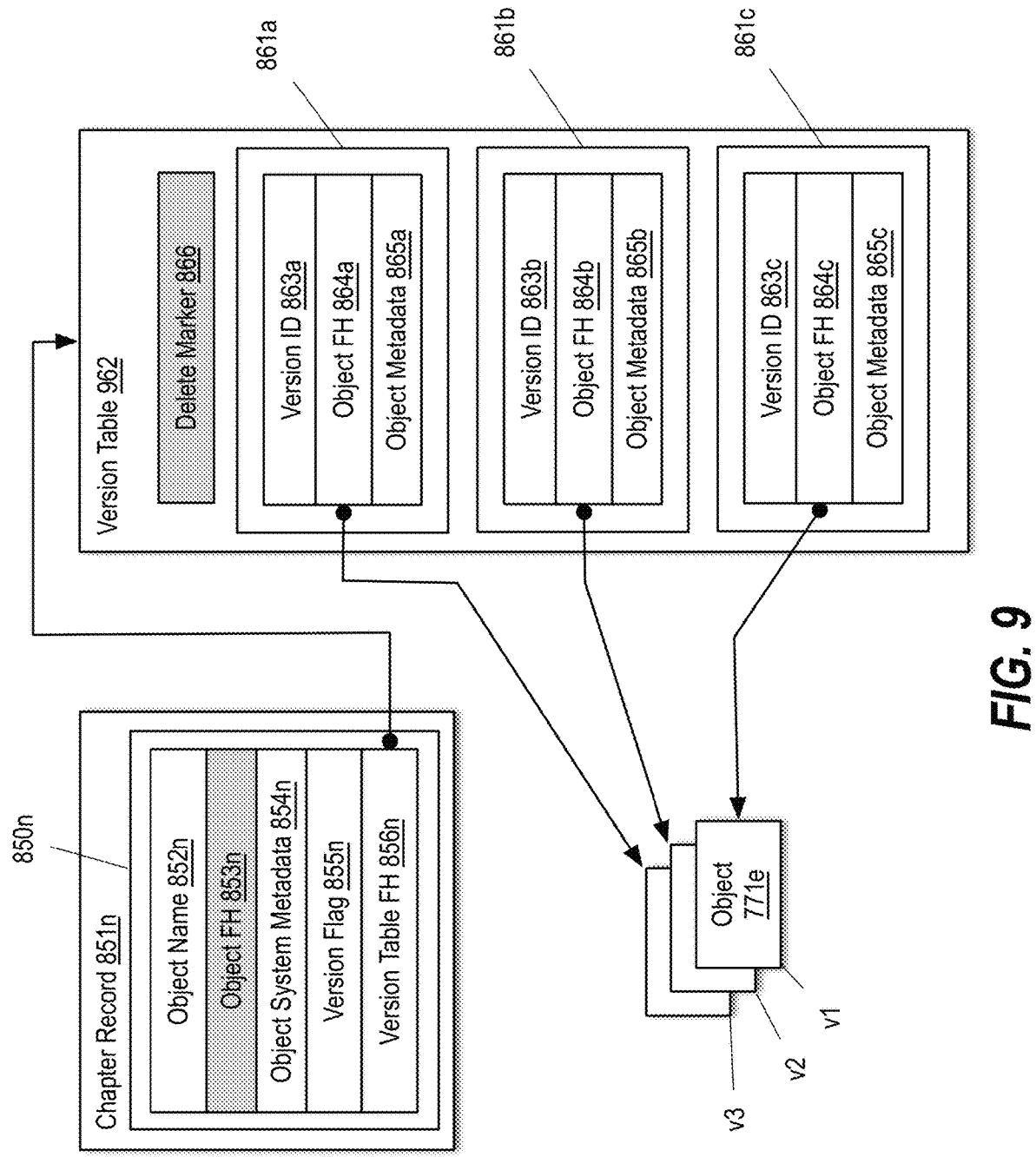
FIG. 9 is a block diagram illustrating a chapter record and a version table for a deleted object in accordance with one or more embodiments.

FIG. 9 is a block diagram illustrating a chapter record 851n and a version table 862 for a deleted object (e.g., object 771e) in accordance with one or more embodiments. FIG. 9 is essentially the same as FIG. 8 except for the portions shown with a gray background. In the context of this example, assuming object 771e has been requested to be deleted, a delete marker 866 is added to the version table 852 and the object FH 853b of the chapter record 851n is set to null. In this manner, if the deletion of the object was unintentional, all versions of the object remain and may be easily restored.

Example Network Environment

Figure 10:
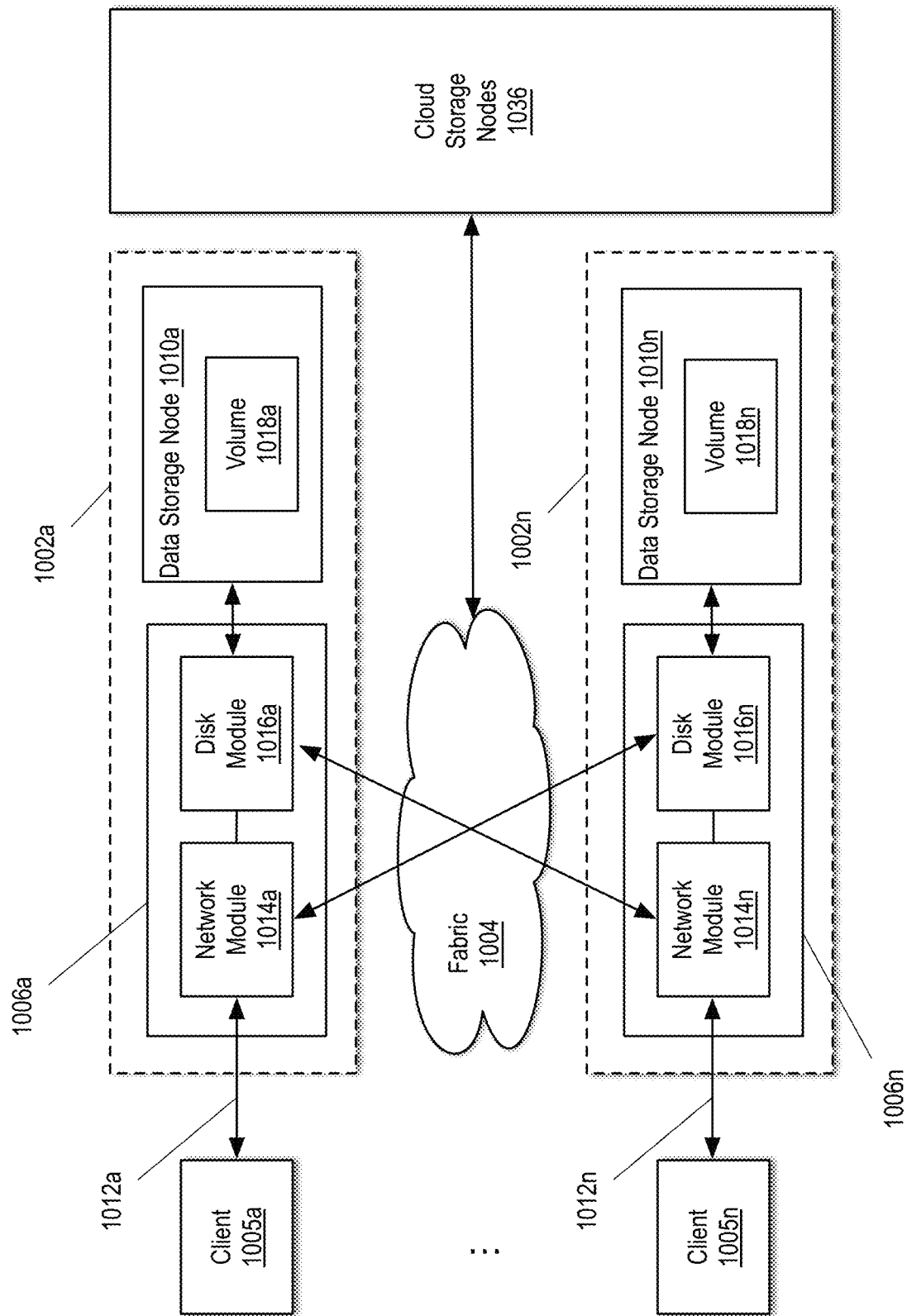
FIG. 10 is a block diagram illustrating an example of a network environment in accordance with one or more embodiments.

FIG. 10 is a block diagram illustrating an example of a network environment 1000 in accordance with one or more embodiments. Network environment 1000 illustrates a non-limiting architecture for implementing a distributed storage system (e.g., cluster 101 or 235). The embodiments described above may be implemented within one or more storage apparatuses, such as any single or multiple ones of data storage apparatuses 1002a-n of FIG. 10. For example, the multitiered namespace 400 and the V+ tree described with reference to FIG. 7 may be implemented within node computing devices 1006a-n and/or data storage nodes 1010a-n. In one or more embodiments, nodes 102 may be implemented in a manner similar to node computing devices 1006a-n and/or data storage nodes 1010a-1010n.

Network environment 1000, which may take the form of a clustered network environment, includes data storage apparatuses 1002a-n that are coupled over a cluster or cluster fabric 1004 that includes one or more communication network(s) and facilitates communication between data storage apparatuses 1002a-n (and one or more modules, components, etc. therein, such as, node computing devices 1006a-n (also referred to as node computing devices), for example), although any number of other elements or components can also be included in network environment 1000 in other examples. This technology provides a number of advantages including methods, non-transitory computer-readable media, and computing devices that implement the techniques described herein.

In this example, node computing devices 1006a-n may be representative of primary or local storage controllers or secondary or remote storage controllers that provide client devices 908a-n (which may also be referred to as client nodes and which may be analogous to clients 105, 205, and 305) with access to data stored within data storage nodes 1010a-n (which may also be referred to as data storage devices) and cloud storage node(s) 1036 (which may also be referred to as cloud storage device(s) and which may be analogous to hyperscale disks 325). The node computing devices 1006a-n may be implemented as hardware, software (e.g., a storage virtual machine), or combination thereof.

Data storage apparatuses 1002a-n and/or node computing devices 1006a-n of the examples described and illustrated herein are not limited to any particular geographic areas and can be clustered locally and/or remotely via a cloud network, or not clustered in other examples. Thus, in one example data storage apparatuses 1002a-n and/or node computing devices 1006a-n can be distributed over multiple storage systems located in multiple geographic locations (e.g., located on-premise, located within a cloud computing environment, etc.); while in another example a network can include data storage apparatuses 1002a-n and/or node computing devices 1006a-n residing in the same geographic location (e.g., in a single on-site rack).

In the illustrated example, one or more of client devices 1008a-n, which may be, for example, personal computers (PCs), computing devices used for storage (e.g., storage servers), or other computers or peripheral devices, are coupled to the respective data storage apparatuses 1002a-n by network connections 1012a-n. Network connections 1012a-n may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, client devices 1008a-n may be general-purpose computers running applications and may interact with data storage apparatuses 1002a-n using a client/server model for exchange of information. That is, client devices 1008a-n may request data from data storage apparatuses 1002a-n (e.g., data on one of the data storage nodes 1010a-n managed by a network storage controller configured to process I/O commands issued by client devices 1008a-n, and data storage apparatuses 1002a-n may return results of the request to client devices 1008a-n via the network connections 1012a-n.

The node computing devices 1006a-n of data storage apparatuses 1002a-n can include network or host nodes that are interconnected as a cluster to provide data storage and management services, such as to an enterprise having remote locations, cloud storage (e.g., a storage endpoint may be stored within cloud storage node(s) 1036), etc., for example. Such node computing devices 1006a-n can be attached to the cluster fabric 1004 at a connection point, redistribution point, or communication endpoint, for example. One or more of the node computing devices 1006a-n may be capable of sending, receiving, and/or forwarding information over a network communications channel, and could comprise any type of device that meets any or all of these criteria.

In an example, the node computing devices 1006a-n may be configured according to a disaster recovery configuration whereby a surviving node provides switchover access to the storage devices 1010a-n in the event a disaster occurs at a disaster storage site (e.g., the node computing device 1006a provides client device 1008n with switchover data access to data storage nodes 1010n in the event a disaster occurs at the second storage site). In other examples, the node computing device 1006n can be configured according to an archival configuration and/or the node computing devices 1006a-n can be configured based on another type of replication arrangement (e.g., to facilitate load sharing). Additionally, while two node computing devices are illustrated in FIG. 10, any number of node computing devices or data storage apparatuses can be included in other examples in other types of configurations or arrangements.

As illustrated in network environment 1000, node computing devices 1006a-n can include various functional components that coordinate to provide a distributed storage architecture. For example, the node computing devices 1006a-n can include network modules 1014a-n and disk modules 1016a-n. Network modules 1014a-n can be configured to allow the node computing devices 1006a-n (e.g., network storage controllers) to connect with client devices 1008a-n over the network connections 1012a-n, for example, allowing client devices 1008a-n to access data stored in network environment 1000.

Further, the network modules 1014a-n can provide connections with one or more other components through the cluster fabric 1004. For example, the network module 1014a of node computing device 1006a can access the data storage node 1010n by sending a request via the cluster fabric 1004 through the disk module 1016n of node computing device 1006n when the node computing device 1006n is available. Alternatively, when the node computing device 1006n fails, the network module 1014a of node computing device 1006a can access the data storage node 1010n directly via the cluster fabric 1004. The cluster fabric 1004 can include one or more local and/or wide area computing networks (i.e., cloud networks) embodied as Infiniband, Fibre Channel (FC), or Ethernet networks, for example, although other types of networks supporting other protocols can also be used.

Disk modules 1016a-n can be configured to connect data storage nodes 1010a-n, such as disks or arrays of disks, SSDs, flash memory, or some other form of data storage, to the node computing devices 1006a-n. Often, disk modules 1016a-n communicate with the data storage nodes 1010a-n according to a SAN protocol, such as SCSI or FCP, for example, although other protocols can also be used. Thus, as seen from an OS on node computing devices 1006a-n, the data storage nodes 1010a-n can appear as locally attached. In this manner, different node computing devices 1006a-n, etc. may access data blocks, files, or objects through the OS, rather than expressly requesting abstract files.

While network environment 1000 illustrates an equal number of network modules 1014a-n and disk modules 1016a-n, other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of client devices 1008a-n can be networked with the node computing devices 1006a-n in the cluster, over the network connections 1012a-n. As an example, respective client devices 1008a-n that are networked to a cluster may request services (e.g., exchanging of information in the form of data packets) of node computing devices 1006a-n in the cluster, and the node computing devices 1006a-n can return results of the requested services to client devices 1008a-n. In one example, client devices 1008a-n can exchange information with the network modules 1014a-n residing in the node computing devices 1006a-n (e.g., network hosts) in data storage apparatuses 1002a-n.

In one example, storage apparatuses 1002a-n host aggregates corresponding to physical local and remote data storage devices, such as local flash or disk storage in the data storage nodes 1010a-n, for example. One or more of the data storage nodes 1010a-n can include mass storage devices, such as disks of a disk array. The disks may comprise any type of mass storage devices, including but not limited to magnetic disk drives, flash memory, and any other similar media adapted to store information, including, for example, data and/or parity information.

The aggregates may include volumes 1018a-n in this example, although any number of volumes can be included in the aggregates. The volumes 1018a-n are virtual data stores or storage objects that define an arrangement of storage and one or more filesystems within network environment 1000. Volumes 1018a-n can span a portion of a disk or other storage device, a collection of disks, or portions of disks, for example, and typically define an overall logical arrangement of data storage. In one example volumes 1018a-n can include stored user data as one or more files, blocks, or objects that may reside in a hierarchical directory structure within the volumes 1018a-n.

Volumes 1018a-n are typically configured in formats that may be associated with particular storage systems, and respective volume formats typically comprise features that provide functionality to the volumes 1018a-n, such as providing the ability for volumes 1018a-n to form clusters, among other functionality. Optionally, one or more of the volumes 1018a-n can be in composite aggregates and can extend between one or more of the data storage nodes 1010a-n and one or more of the cloud storage node(s) 1036 to provide tiered storage, for example, and other arrangements can also be used in other examples.

In one example, to facilitate access to data stored on the disks or other structures of the data storage nodes 1010a-n, a filesystem (e.g., file system layer 311) may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage nodes 1010a-n (e.g., a RAID system, such as RAID layer 313) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more LUNs, directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage nodes 1010a-n can have one or more physical ports, wherein each physical port can be assigned a target address (e.g., SCSI target address). To represent respective volumes, a target address on the data storage nodes 1010a-n can be used to identify one or more of the LUNs. Thus, for example, when one of the node computing devices 1006a-n connects to a volume, a connection between the one of the node computing devices 1006a-n and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

The present embodiments can take the form of an entirely hardware embodiment, an entirely software embodiment, or an embodiment containing both hardware and software elements. Accordingly, it is understood that any operation of the computing systems of the network environment 1000 and the distributed storage system (e.g., cluster 101, cluster 235, and/or a cluster of virtual storage systems 310a-c) may be implemented by a computing system using corresponding instructions stored on or in a non-transitory computer-readable medium accessible by a processing system. For the purposes of this description, a non-transitory computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

Example Computer System

Various components of the present embodiments described herein may include hardware, software, or a combination thereof. Accordingly, it may be understood that in other embodiments, any operation of a distributed storage management system (e.g., the cluster 101, cluster 235, and/or a cluster including virtual storage systems 310a-c) or one or more of its components thereof may be implemented using a computing system via corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

The various systems and subsystems (e.g., file system layer 311, RAID layer 313, and storage layer 315), and/or nodes 102 (when represented in virtual form) of the distributed storage system described herein, and the processing described herein may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems (e.g., servers, network storage systems or appliances, blades, etc.) of various forms, such as the computer system described with reference to FIG. 11 below.

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 11:
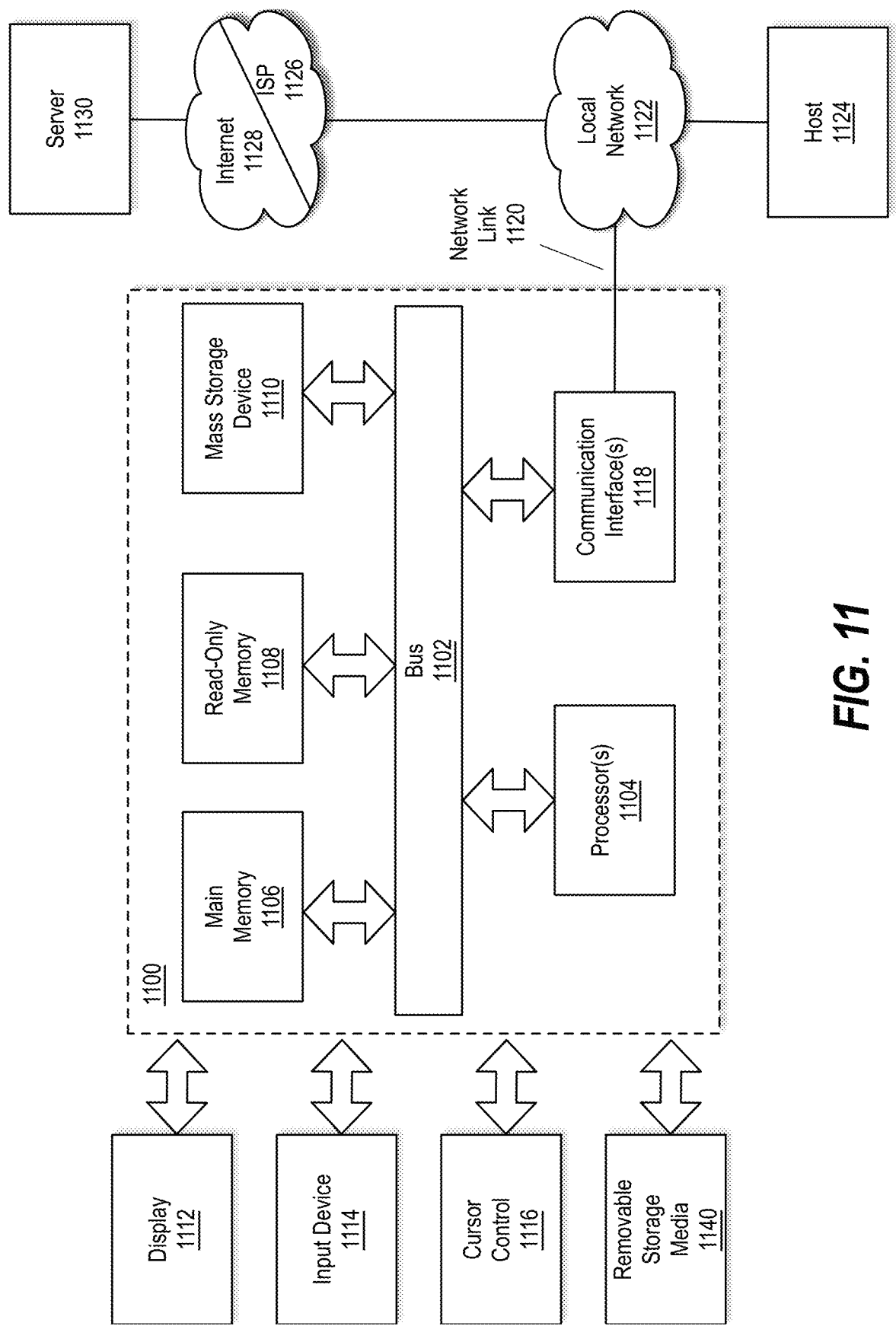
FIG. 11 illustrates an example computer system in which or with which embodiments of the present disclosure may be utilized.

FIG. 11 is a block diagram that illustrates a computer system 1100 in which or with which an embodiment of the present disclosure may be implemented. Computer system 1100 may be representative of all or a portion of the computing resources associated with a node of nodes 102 of a distributed storage system (e.g., cluster 101, cluster 235, or a cluster including virtual storage systems 310a-c). Notably, components of computer system 1100 described herein are meant only to exemplify various possibilities. In no way should example computer system 1100 limit the scope of the present disclosure. In the context of the present example, computer system 1100 includes a bus 1102 or other communication mechanism for communicating information, and a processing resource (e.g., a hardware processor 1104) coupled with bus 1102 for processing information. Hardware processor 1104 may be, for example, a general-purpose microprocessor.

Computer system 1100 also includes a main memory 1106, such as a random-access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, e.g., a magnetic disk, optical disk or flash disk (made of flash memory chips), is provided and coupled to bus 1102 for storing information and instructions.

Computer system 1100 may be coupled via bus 1102 to a display 1112, e.g., a cathode ray tube (CRT), Liquid Crystal Display (LCD), Organic Light-Emitting Diode Display (OLED), Digital Light Processing Display (DLP) or the like, for displaying information to a computer user. An input device 1114, including alphanumeric and other keys, is coupled to bus 1102 for communicating information and command selections to processor 1104. Another type of user input device is cursor control 1116, such as a mouse, a trackball, a trackpad, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Removable storage media 1140 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1100 may implement the techniques described herein using customized hard-wired logic, one or more ASICs or FPGAs, firmware or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1110. Volatile media includes dynamic memory, such as main memory 1106. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, or stored in storage device 1110, or other non-volatile storage for later execution.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
 tracking, by a file system of a storage system, within a tree data structure, a plurality of versions of an object stored on behalf of a client, wherein the tree data structure includes:
  a chapter record containing a single object record for the object including:
   an object name of the object;
   a first object file handle identifying an index of a file containing data of a current version of the plurality of versions of the object; and
   a version table file handle identifying an index of a file containing a version table, wherein the version table includes for each version of the plurality of versions of the object, a version identifier (ID) and a second object file handle identifying an index of a file containing data of the version of the object;
 receiving, by the file system, a request relating to the object, wherein the request includes the object name; and
 servicing, by the file system, the request by locating the single object record based on the object name.

2. The method of claim 1, wherein the request comprises a read request and the read request further includes an indication regarding a version of the plurality of versions of the object and wherein the method further comprises returning, by the file system, the data of the version of the object to the client based on the tree data structure and the read request.

3. The method of claim 2, further comprising:
 based on the version representing a prior version of the object, locating, by the file system, within the version table, the second object file handle for the prior version; and
 based on the second object file handle, retrieving, by the file system, the data on behalf of the client.

4. The method of claim 2, further comprising based on the version representing the current version, retrieving, by the file system, the data on behalf of the client using the first object file handle.

5. The method of claim 1, wherein the request comprises a write request and the write request further includes data for the object and wherein the method further comprises creating, by the file system, a new version of the object within the tree data structure by:
 adding, by the file system, a new version record to the version table; and
 updating, by the file system, the first object file handle to point to the new version record.

6. The method of claim 1, wherein the request represents an object storage protocol request.

7. The method of claim 1, wherein the version ID comprises a time at which the version of the object was created.

8. The method of claim 1, wherein the tree data structure includes a plurality of nodes having variable-length data and wherein the tree data structure is searchable based on a variable-length key.

9. A non-transitory machine readable medium storing instructions, which when executed by one or more processing resources of a storage system, cause a file system of the storage system to:
 track within a tree data structure, a plurality of versions of an object stored on behalf of a client, wherein the tree data structure includes:
  a chapter record containing a single object record for the object including:
   an object name of the object;
   a first object file handle identifying an index of a file containing data of a current version of the plurality of versions of the object; and
   a version table file handle identifying an index of a file containing a version table, wherein the version table includes for each version of the plurality of versions of the object, a version identifier (ID) and a second object file handle identifying an index of a file containing data of the version of the object;
 receive a request relating to the object, wherein the request includes the object name; and
 service the request by locating the single object record based on the object name.

10. The non-transitory machine readable medium of claim 9, wherein the request comprises a read request and the read request further includes an indication regarding a version of the plurality of versions of the object and wherein the instructions further cause the file system to return the data of the version of the object to the client based on the tree data structure and the read request.

11. The non-transitory machine readable medium of claim 10, wherein the instructions further cause the file system to:
 based on the version representing a prior version of the object, locate, within the version table, the second object file handle for the prior version; and
 based on the second object file handle, retrieve the data on behalf of the client.

12. The non-transitory machine readable medium of claim 10, wherein the instructions further cause the file system to, based on the version representing the current version, retrieve the data on behalf of the client using the first object file handle.

13. The non-transitory machine readable medium of claim 9, wherein the request comprises a write request and the write request further includes data for the object and wherein the instructions further cause the file system to create a new version of the object within the tree data structure by:
 adding a new version record to the version table; and
 updating the first object file handle to point to the new version record.

14. The non-transitory machine readable medium of claim 9, wherein the request represents an object storage protocol request.

15. The non-transitory machine readable medium of claim 9, wherein the version ID comprises a time at which the version of the object was created.

16. The non-transitory machine readable medium of claim 9, wherein the tree data structure includes a plurality of nodes having variable-length data and wherein the tree data structure is searchable based on a variable-length key.

17. A storage system comprising
one or more processing resources; and
instructions that when executed by the one or more processing resource cause a file system of the storage system to:
  track within a tree data structure, a plurality of versions of an object stored on behalf of a client, wherein the tree data structure includes:
    a chapter record containing a single object record for the object including:
      an object name of the object;
      a first object file handle identifying an index of a file containing data of a current version of the plurality of versions of the object; and
      a version table file handle identifying an index of a file containing a version table, wherein the version table includes for each version of the plurality of versions of the object, a version identifier (ID) and a second object file handle identifying an index of a file containing data of the version of the object;
  receive a request relating to the object, wherein the request includes the object name; and
  service the request by locating the single object record based on the object name.

18. The storage system of claim 17, wherein the request comprises a read request and the read request further includes an indication regarding a version of the plurality of versions of the object and wherein the instructions further cause the file system to return the data of the version of the object to the client based on the tree data structure and the read request.

19. The storage system of claim 18, wherein the instructions further cause the file system to:
  based on the version representing a prior version of the object, locate, within the version table, the second object file handle for the prior version; and
  based on the second object file handle, retrieve the data on behalf of the client.

20. The storage system of claim 18, wherein the instructions further cause the file system to, based on the version representing the current version, retrieve the data on behalf of the client using the first object file handle.

21. The storage system of claim 17, wherein the request comprises a write request and the write request further includes data for the object and wherein the instructions further cause the file system to create a new version of the object within the tree data structure by:
  adding a new version record to the version table; and
  updating the first object file handle to point to the new version record.

22. The storage system of claim 17, wherein the request represents an object storage protocol request.

23. The storage system of claim 17, wherein the version ID comprises a time at which the version of the object was created.

24. The storage system of claim 17, wherein the tree data structure includes a plurality of nodes having variable-length data and wherein the tree data structure is searchable based on a variable-length key.

* * * * *